United States Patent
Zhou et al.

(10) Patent No.: US 11,061,115 B2
(45) Date of Patent: Jul. 13, 2021

(54) METHOD FOR GESTURE RECOGNITION, TERMINAL, AND STORAGE MEDIUM

(71) Applicant: GUANGDONG OPPO MOBILE TELECOMMUNICATIONS CORP., LTD., Guangdong (CN)

(72) Inventors: Anfu Zhou, Guangdong (CN); Huadong Ma, Guangdong (CN); Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/826,073

(22) Filed: Mar. 20, 2020

(65) Prior Publication Data
US 2020/0217930 A1     Jul. 9, 2020

Related U.S. Application Data

(63) Continuation of application No. PCT/CN2018/103362, filed on Aug. 30, 2018.

(51) Int. Cl.
*G01S 7/41* (2006.01)
*G01S 7/35* (2006.01)
(Continued)

(52) U.S. Cl.
CPC .............. *G01S 7/415* (2013.01); *G01S 7/354* (2013.01); *G01S 7/414* (2013.01); *G01S 13/583* (2013.01); *G06F 3/017* (2013.01)

(58) Field of Classification Search
CPC ............... G06F 3/017; G06K 9/00335; G05B 2219/35444; G01S 7/415; G01S 7/354; G01S 7/414; G01S 13/583
See application file for complete search history.

(56) References Cited

U.S. PATENT DOCUMENTS

| 10,496,182 | B2 * | 12/2019 | Lien | G01S 7/415 |
| 2013/0241765 | A1 * | 9/2013 | Kozma | G01S 13/56 |
|  |  |  |  | 342/107 |

(Continued)

FOREIGN PATENT DOCUMENTS

| CN | 105094298 A | 11/2015 |
| CN | 105306819 A | 2/2016 |

(Continued)

OTHER PUBLICATIONS

International Search Report in the International Application No. PCT/CN2018/103362, dated Jun. 4, 2019.

(Continued)

*Primary Examiner* — Peter M Bythrow
(74) *Attorney, Agent, or Firm* — Ladas & Parry, LLP

(57) ABSTRACT

A method for gesture recognition, a terminal, and a storage medium are provided by the embodiments of the present application. The method may include: receiving, through the millimeter wave apparatus, a first millimeter wave, where the first millimeter wave is a reflected wave formed after a second millimeter wave transmitted by the millimeter wave apparatus is modulated via a gesture motion; processing the first millimeter wave based on two types of time arrays and Doppler estimation to obtain at least one set of signal characteristic values corresponding to the first millimeter wave; identifying the at least one set of signal characteristic values using a correspondence library of standard characteristic values and control instructions, and obtaining a first control instruction corresponding to the gesture motion; and controlling a first application to implement a corresponding function using the first control instruction.

20 Claims, 9 Drawing Sheets

(51) Int. Cl.
*G01S 13/58* (2006.01)
*G06F 3/01* (2006.01)

(56) References Cited

U.S. PATENT DOCUMENTS

| | | | | |
|---|---|---|---|---|
| 2014/0316261 A1* | 10/2014 | Lux | ................ | G01S 13/56 600/430 |
| 2016/0259037 A1* | 9/2016 | Molchanov | ........ | G06K 9/00355 |
| 2016/0320854 A1* | 11/2016 | Lien | ................ | G01S 7/354 |
| 2016/0377705 A1* | 12/2016 | Zack | ................ | G01S 13/0209 342/21 |
| 2017/0102457 A1* | 4/2017 | Li | ................ | G01S 7/35 |
| 2019/0240535 A1* | 8/2019 | Santra | ................ | A63B 22/025 |
| 2019/0302253 A1* | 10/2019 | Santra | ................ | G01S 7/354 |

FOREIGN PATENT DOCUMENTS

| | | |
|---|---|---|
| CN | 107024685 A | 8/2017 |
| CN | 107961035 A | 4/2018 |
| CN | 108200706 A | 6/2018 |
| CN | 108361780 A | 8/2018 |
| WO | 2020042121 A1 | 3/2020 |

OTHER PUBLICATIONS

Written Opinion of the International Searching Authority in International Application No. PCT/CN2018/103362, dated Jun. 4, 2019 with English translation provided by Google Translate.
The EESR of corresponding European application No. 18923764.7, dated Jul. 24, 2020.

\* cited by examiner

| Serial Number | Name of Characteristic Values |
|---|---|
| 1 | num_detection |
| 2 | Doppler_average |
| 3 | range_average |
| 4 | magnitude_sum |
| 5 | positive num_detetion |
| 6 | range index |
| 7 | negative num_detection |
| 8 | negative doppler_average |
| 9 | range_display |
| 10 | angle_value |
| 11 | prediction_result |

FIG. 3

METHOD FOR GESTURE RECOGNITION, TERMINAL, AND STORAGE MEDIUM

CROSS-REFERENCE TO RELATED APPLICATIONS

This application is a continuation of International Application No. PCT/CN2018/103362, filed on Aug. 30, 2018, the disclosure of which is hereby incorporated by reference in its entirety.

TECHNICAL FIELD

The present application relates to the field of electronic application, and in particular, to a method for gesture recognition, a terminal and a storage medium.

BACKGROUND

In recent years, with the rapid development of intelligent terminal, the functions of the terminal have become more and more abundant, and the control of users on the terminal is not limited to the operation manners such as clicking and sliding on the display interface of the terminal. In the future, gesture perception will become a development trend for the control of the terminals by users, where the user does not need to touch the terminal, and only needs to change different gestures within a certain range of the terminal, so that the terminal recognizes different gestures to implement corresponding different functions, which expands the manner of controlling of the terminal by users. The existing schemes of gesture recognition include sound wave gesture recognition and gesture recognition based on image analysis of visible light camera, which have the problem of a low accuracy of gesture recognition.

The solution of sound wave gesture recognition is taken as an example, in which the terminal reconstructs the gesture motion according to the ultrasonic signal generated by a gesture motion of the user, however the accuracy of the gesture recognition of the scheme of sound wave gesture recognition in a noisy environment is greatly reduced. The scheme of gesture recognition based on image analysis of visible light camera is taken as another example, in which the terminal reconstructs the gesture motion according to a multi-angle gesture image captured by a camera, however, the accuracy of gesture recognition of this scheme is relatively low in a dim light or zero light environment.

SUMMARY

The embodiments of the present application are intended to provide a method for gesture recognition, a terminal, and a storage medium, which can improve the accuracy of gesture recognition.

The embodiment of the present application provides a method for gesture recognition, which is applied to a terminal, where the terminal is provided with a millimeter wave apparatus, and the method includes:
  receiving, through the millimeter wave apparatus, a first millimeter wave, where the first millimeter wave is a reflected wave formed after a second millimeter wave transmitted by the millimeter wave apparatus is modulated via a gesture motion;
  processing the first millimeter wave based on two types of time arrays and Doppler estimation to obtain at least one set of signal characteristic values corresponding to the first millimeter wave, where each set of signal characteristic values of the at least one set of signal characteristic values correspond to one frame of signal in the first millimeter wave;
  identifying the at least one set of signal characteristic values using a correspondence library of standard characteristic values and control instructions, and obtaining a first control instruction corresponding to the gesture motion; and
  controlling a first application to implement a corresponding function using the first control instruction.

An embodiment of the present application provides a terminal, where the terminal includes: a processor, a receiver, a memory, and a communication bus, where the terminal is provided with a millimeter wave apparatus, and the receiver is configured to receive a first millimeter wave through the millimeter wave apparatus, where the first millimeter wave is a reflected wave formed after a second millimeter wave transmitted by the millimeter wave apparatus is modulated via a gesture motion; where the processor is configured to execute an operating program stored in the memory to implement the following steps:
  processing the first millimeter wave based on two types of time arrays and Doppler estimation to obtain at least one set of signal characteristic values corresponding to the first millimeter wave, where each set of signal characteristic values of the at least one set of signal characteristic values correspond to one frame of signal in the first millimeter wave; identifying the at least one set of signal characteristic values using a correspondence library of standard characteristic values and control instructions, and obtaining a first control instruction corresponding to the gesture motion; and controlling a first application to implement a corresponding function using the first control instruction.

The embodiment of the present application provides a storage medium, on which a computer program is stored, and the storage medium is applied to a terminal, and when the computer program is executed by a processor, any one of the methods for gesture recognition as described above is implemented.

The embodiments of the present application provide a method for gesture recognition, a terminal, and a storage medium. The method includes: receiving, through the millimeter wave apparatus, a first millimeter wave, where the first millimeter wave is a reflected wave formed after a second millimeter wave transmitted by the millimeter wave apparatus is modulated via a gesture motion; processing the first millimeter wave based on two types of time arrays and Doppler estimation to obtain at least one set of signal characteristic values corresponding to the first millimeter wave, where each set of signal characteristic values of the at least one set of signal characteristic values correspond to one frame of signal in the first millimeter wave; identifying the at least one set of signal characteristic values using a correspondence library of standard characteristic values and control instructions, and obtaining a first control instruction corresponding to the gesture motion; and controlling a first application to implement a corresponding function using the first control instruction. With the above solution, the terminal receives the first millimeter wave modulated by the gesture motion through the millimeter wave apparatus, and processes the first millimeter wave based on the two types of time arrays according to the characteristic of small wavelength of the first millimeter wave, and obtains at least one set of signal characteristic values corresponding to the processed first millimeter wave using Doppler estimation, and finally obtains the first control instruction corresponding to the gesture motion using the at least one set of signal characteristic values and the correspondence library of standard characteristic values and control instructions, thereby subtle gestures motion can be identified, and the accuracy of gesture perception is improved.

BRIEF DESCRIPTION OF DRAWINGS

FIG. 3 is a display diagram of an exemplary characteristic value corresponding to one frame of signal according to an embodiment of the present application;

DESCRIPTION OF EMBODIMENTS

Figure 1:
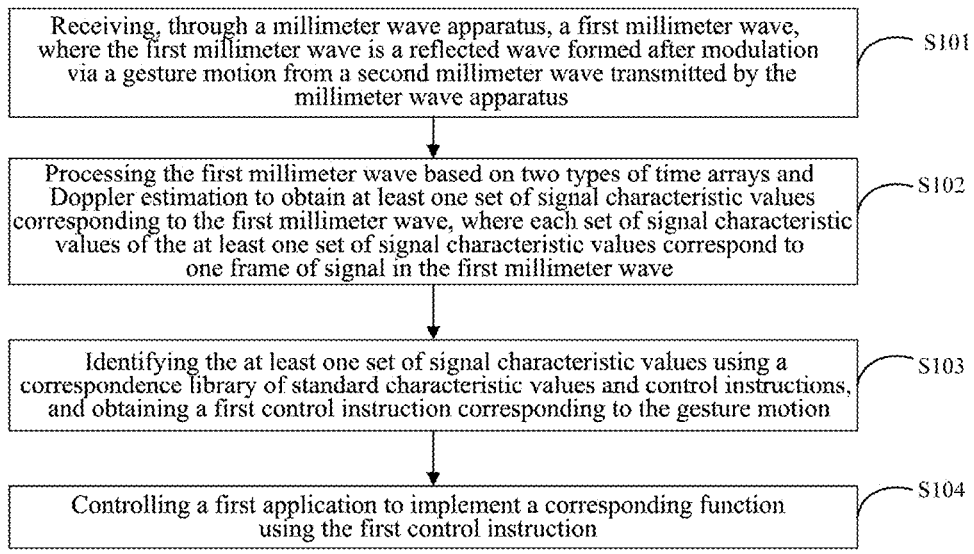
FIG. 1 is a first flowchart of a method for gesture recognition according to an embodiment of the present application.

In order to make the features and technical contents of the embodiments of the present application be understood in more detail, the implementations of the present application are elaborated in detail in combination with the accompanying drawings as follows, where the attached drawings are for illustrative purposes only and are not used to limit the embodiments of the present application.

The millimeter wave refers to the frequency band of 30-300 GHz. The abundance of available bandwidth of this frequency band results in a large transmission rate when the data transmission is performed on the frequency band of millimeter wave; the millimeter wave becomes the frequency band of communication used by the 5$^{th}$ generation (5G) wireless communication technology due to the characteristics of a large bandwidth and a high rate, and the wireless network rate can be greatly increased using millimeter waves to perform the data transmission. For example, IEEE 802.11ad operating in the frequency band of 60 GHz supports the rate of data transmission up to 6.7 Gbps, while its evolution standard IEEE 802.11ay will provide the rate of data transmission of 20 Gbps. Therefore, millimeter wave radio is expected to enable wireless network to enter the multi-Gbps era. Therefore, millimeter wave radio module will be widely installed on mobile phones, wearables, smart hardware or a wider range of IoT (Internet of Things) devices, becoming a mainstream communication technology. In addition to the high rate link, the characteristics of short wavelength, large bandwidth, and directional beams of the millimeter wave make high-resolution and highly robust human gesture perception possible.

Millimeter wave perception technology provides a smarter, more convenient, and more interesting application experience of human-computer interaction. The basic principle is, transmitting, by a millimeter wave RF module, a millimeter wave, receiving, by a receiving module, a reflected wave of a gesture motion, and speculating the size of the distance, angle, velocity and energy of the gesture process via the reflected wave, so as to perform the classification of the motions. The millimeter wave supports a variety of perception functions such as distance measurement, gesture detection, approaching detection, people number detection, distance measurement, and existence detection, which can be applied in the following scenarios:

A ringtone scenario, such as the scenario of incoming calls and alarm clocks, where the user can lower the volume of the ringtone down to mute by a specific gesture (for example, close to the mobile phone).

A process of selfie, where a series of gestures can be used to "tell" the mobile phone the timing of photographing, the adjustment of brightness, the adjustment of focal distances, etc., thereby avoiding the inconvenient operation of touching the screen of the mobile phone.

A leftward/rightward/upward/downward slide at the upper side of the screen, to view a previous/next application, return to the desktop or enter a multitask.

An upward slide at the upper side of the screen, or a multi-finger pinch to enter the multitask or a specific mode.

Recognition of the fine gestures of the user near the frame of the mobile phone to perform button operations such as hover slide, volume adjustment and brightness adjustment of the video, music switch, and camera filter switch.

A hover pat by a hand over the upward side of the screen to take a screenshot.

A hover click performed to simulate the motion of screen clicking when it is not convenient to click the screen (such as with hands in gloves), Recognition of the movement locus of hand to add some video and photo effects.

Long-distance photography, where gestures are used to switch camera filters, adjust the focal distance of camera, pause and continue, delete captured content, and the like.

The following are scenarios in which the gesture recognition is performed using the millimeter wave in a photographing scenario according to an embodiment of the present application.

Embodiment 1

An embodiment of the present application provides a method for gesture recognition, which is applied to a terminal provided with a millimeter wave apparatus. As shown in FIG. 1, the method may include:

S101. Receiving, through a millimeter wave apparatus, a first millimeter wave, where the first millimeter wave is a reflected wave formed after a second millimeter wave transmitted by the millimeter wave apparatus is modulated via a gesture motion.

The method for gesture recognition provided by the embodiment of the present application is applied to a scenario in which a gesture of a user is perceived to implement a contactless photography.

In the embodiment of the present application, the terminal may be any device having functions of communication and storage, such as a tablet computer, a mobile phone, an e-reader, a remote controller, a personal computer (PC), a notebook computer, an in-vehicle device, a network television, and a wearable device. The terminal is specifically selected according to the actual situation, and is not specifically limited in this embodiment.

In the embodiment of the present application, the millimeter wave apparatus is disposed inside the screen of the terminal, and the millimeter wave apparatus includes a transmitting antenna and a receiving antenna.

It can be understood that since the millimeter wave radio can penetrate non-metal materials such as plastic, the millimeter wave apparatus is hidden and disposed inside the screen of the terminal, which does not change the appearance of the terminal and is thus of great significance for the shape design of the terminal.

In the embodiment of the present application, the terminal transmits a wireless signal (second millimeter wave) through the transmitting antenna of the millimeter wave apparatus; a reflected signal (first millimeter wave) is formed after modulation via the hand motion in the transmission range of the wireless signal; and then the transmitted signal is captured by the receiving antenna of the millimeter wave apparatus.

In the embodiment of the present application, the terminal may transmit the wireless signal through the transmitting antenna of the millimeter wave apparatus when the preset transmission time arrives, or the terminal may transmit the wireless signal through the transmitting antenna of the millimeter wave apparatus when a first application such as a photographing application or a video shooting application is launched, and the specific timing at which the terminal transmits the wireless signal through the transmitting antenna of the millimeter wave apparatus is selected according to the actual situation, which is not specifically limited in the embodiment of the present application.

In the embodiment of the present application, the form of transmitting the wireless signal by the millimeter wave apparatus is periodically transmitting Frequency Modulated Continuous Wave (FMCW), so that the frequency changing rule of the first millimeter wave and that of the second millimeter wave are the same, which are both triangular wave rule, however there is only a time difference in between, and the terminal can use this small time difference to calculate the target distance.

Figure 2:
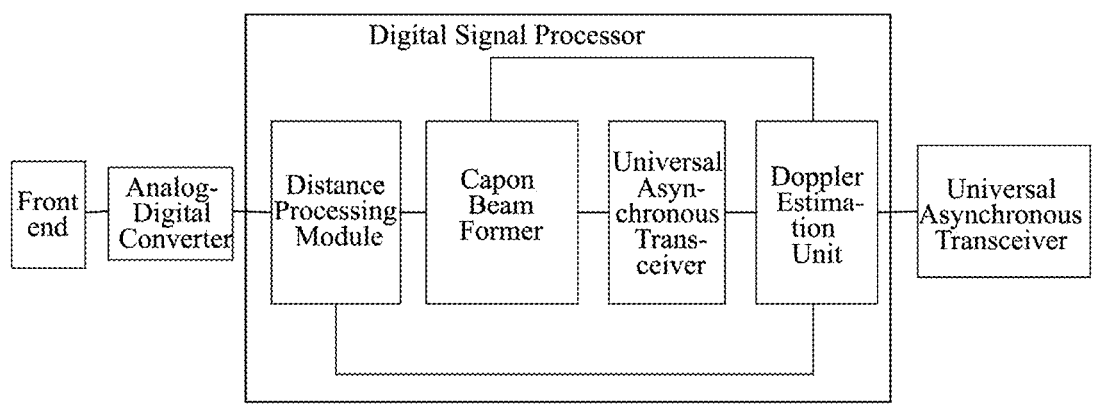
FIG. 2 is a structural composition diagram of an exemplary terminal according to an embodiment of the present application.

Exemplarily, as shown in FIG. 2, a Digital Signal Processing (DSP) is disposed on the terminal, where the DSP is composed of four parts as a distance processing module, a Capon beam former, and an object detection unit, and a Doppler estimation unit, where Distance processing module: after the receiving antenna receives the reflected wave, the reflected wave is cached into an output cache area of an Analog-to-Digital converter (ADC), and then the millimeter wave apparatus moves the reflected wave from the output cache area of the ADC to the local memory within the DSP. At this time, the distance processing module performs a 16-bit fixed-point 1-D window and a Fast Fourier transform (FFT) of a 16-bit fixed-point 1-D, and transmits the result to the Doppler estimation unit.

Capon beam former: configured to reconstruct a source signal from a sensor array using formula (1)

$$X(t)=A(\theta)s(t)+n(t) \quad (1)$$

where s(t) is an input signal after mixing the baseband signals;

the static sundries is removed by removing the DC components of each distance receiver in the distance processing module, thereby eliminating reflections of static objects such as tables, chairs, etc. at the region of interest;

the spatial covariance matrix $R_n$ of each distance receiver is calculated using the intra-frame multiple linear frequency modulation, then $R_n$ is inverted to obtain $R_n^{-1}$, and the upper diagonal of $R_n^{-1}$ of each distance receiver is stored in the memory, after which the output of the Capon beam former is calculated for each distance receiver, and the angular spectrum is stored in the memory to construct a [distance, azimuth] heat map, and finally the [distance, azimuth] heat map is transmitted to the Doppler estimation unit.

Object detection unit: a first channel in a distance domain and a second channel in an angle domain are processed using a Constant False-Alarm Rate (CFAR) detection algorithm, and the second channel confirms the result of the first channel, thereby removing clutter and noise, and determining a detection point.

Doppler estimation unit: for each [distance, azimuth] pair, the distance receiver is filtered using the Capon beam weighting algorithm, and then the peak search is performed on the FFT of the filtered distance receiver to estimate Doppler.

S102. Processing the first millimeter wave based on two types of time arrays and Doppler estimation to obtain at least one set of signal characteristic values corresponding to the first millimeter wave, where each set of signal characteristic values of the at least one set of signal characteristic values correspond to one frame of signal in the first millimeter wave.

After receiving the first millimeter wave through the millimeter wave apparatus, the terminal processes the first millimeter wave to obtain at least one set of signal characteristic values corresponding to the first millimeter wave.

In the embodiment of the present application, after receiving the first millimeter wave, the terminal processes the first millimeter wave based on the two types of time arrays to obtain a motion characteristic corresponding to the gesture motion, where the motion characteristic characterizes a displacement information of the gesture motion; thereafter, the terminal extracts the at least one set of signal characteristic values from the motion characteristic based on the Doppler estimation, where each set of signal characteristic values of the at least one set of signal characteristic values correspond to one frame of signal in the characterization of the motion characteristic.

In the embodiment of the present application, the two types of time arrays include a fast time array and a slow time array, and the terminal processes the first millimeter wave into at least one beam, where each beam of the at least one beam corresponds to a received first millimeter wave at one receiving time point; the terminal obtains at least one piece of first information corresponding to the at least one beam in the fast time array, where the at least one piece of first information characterizes at least one frequency corresponding to the at least one beam; and thereafter, the terminal determines second information according to the at least one piece of first information in the slow time array, and the second information characterizes a frequency change between the at least one beam; and the second information is determined as a motion characteristic.

In the embodiment of the present application, the terminal processes the first millimeter wave into at least one beam corresponding to each receiving time point, and the terminal calculates a frequency corresponding to each beam of the at least one beam in the fast time array, after which the terminal calculates the frequency change between the at least one beam according to the frequency corresponding to each beam of the at least one beam in the slow time array, where the frequency change characterizes the displacement information of the gesture motion, and the terminal determines the frequency change as the motion characteristic of the gesture motion.

It should be noted that the basic principle for the terminal to recognize different hand motions is: the hand is assumed to be a discrete dynamic scattering center, and the Radio Frequency (RF) response of the hand is modeled as a superposition of responses from the discrete dynamic scattering center; when the wavelength is smaller than the target spatial range, the scattering center model is consistent with the geometrical theory of diffraction; due to the characteristic of short wavelength of the millimeter wave, the above assumption is applied to the hand motion perception of the millimeter wave. This scheme adopts a generalized time-varying scattering center model and considers non-rigid hand dynamics, that is, each scattering center is parameterized via a composite reflectivity parameter and a radial distance from a sensor, where the composite reflectivity parameter is frequency dependent, which changes with the regional geometry of the hand with respect to the direction of the radar and the like. Therefore, the present application employs high temporal resolution perception, that is, the response of the hand to the radar is measured through a high frame rate, and then subtle temporal signal changes corresponding to these hand motions are extracted to detect subtle and complex hand motions. The terminal controls the millimeter wave apparatus to transmit a periodic modulation waveform to implement the above concept, and the millimeter wave radar separately measures the corresponding received waveform in each transmission cycle. Therefore, in order to implement the above scheme, the present application defines two different time scales which are respectively short time scale perception and long time scale perception for analyzing the reflected first millimeter wave.

In the embodiment of the present application, the terminal uses short time scale perception in the fast time array and long time scale perception in the slow time array.

In this case, the principle of short time scale perception is that the high radar repetition frequency links the scattering center hand model with the signal processing method, for a high velocity radar frequency which is high enough and a hand motion which is relatively slow, the scattering center model is approximately constant within a single radar repetition interval, where the scattering center range and reflectivity are functions that closely follow the change of the short term scale T. The hand is illuminated with a single wide beam in each transmission cycle, and all the scattering centers on the hand simultaneously reflect the signal, and the measurement waveform consists of the reflection of each scattering center and is superimposed in the fast time, where each individual reflection waveform has instantaneous reflectivity and range modulation of the relevant scattering center; after RF demodulation and modulation of specific filtered wave, the preprocessed received signal represents the superposition of the responses from respective scattering centers. The high radar repetition frequency is capable of, in the slow time, capturing fine phase changes in the received signal corresponding dynamically to the scattering center.

In this case, the principle of long time scale perception is that when the scattering center moves, the relative displacement of the scattering center may generate a phase change proportional to the wavelength. The dependence of the phase change on the displacement allows the millimeter wave apparatus to find the scattered scattering center in the slow time according to its phase. Assuming that the velocity of each scattering center is approximately constant over some coherent processing time greater than the radar repetition interval, the phase over the coherent processing time then generates a Doppler frequency, thus the Doppler frequencies of multiple scattering centers moving at different velocities can be analyzed by calculating the spectrum of the waveform of each fast time window over the coherent processing slow time window.

In the embodiment of the present application, the terminal processes the first millimeter wave into the motion characteristic corresponding to the gesture motion using short time scale perception and long time scale perception.

In the embodiment of the present application, a certain number of consecutive pre-processed radar signals are buffered in the fast time array and the slow time array for characterizing the motion characteristic.

In the embodiment of the present application, each frame of signal is composed of at least 11 characteristic values. As shown in FIG. 3, the 11 characteristic values include: num_detection, Doppler_average, and range_average, magnitude_sum, positive num_detetion, range index, negative num_detection, negative doppler_average, range_display, angle_value and prediction_result.

In the embodiment of the present application, the Doppler effect is used to calculate the velocity of the gesture motion and the Doppler shift, and the FMCW principle is used to calculate the distance from the gesture motion to the terminal.

S103. Identifying the at least one set of signal characteristic values using a correspondence library of standard characteristic values and control instructions, and obtaining a first control instruction corresponding to the gesture motion.

After obtaining the at least one set of signal characteristic values, the terminal uses the correspondence library of standard characteristic values and control instructions to identify the at least one set of signal characteristic values, and obtains the first control instruction corresponding to the gesture motion.

In the embodiment of the present application, the correspondence library of standard characteristic values and control instructions is a relational library obtained through the learning by a preset neural network, specifically, the terminal learns the standard gesture motion using the preset neural network, and obtains at least one set of standard characteristic values corresponding to one control instruction; the terminal combines the control instruction and the corresponding at least one set of standard characteristic values into the correspondence library of standard characteristic values and control instructions, and after the terminal obtains the at least one set of signal characteristic values corresponding to the first millimeter wave, the terminal searches for the first control instruction corresponding to the at least one set of signal characteristic values from the correspondence library of standard characteristic values and control instructions.

In an implementation, the preset neural network is a 6-layer residual network obtained after removing the last three layers of a residual network resnet18.

In the embodiment of the present application, after receiving the standard gesture motion corresponding to each control instruction, the terminal processes the standard gesture motion to obtain a set of frame sequence signals (standard frame signals) corresponding to the standard gesture motion, where each frame sequence signal within the set of frame sequence signals corresponds to a set of characteristic values (a preset number of standard signal characteristic values), and the terminal inputs the at least one set of characteristic values corresponding to the set of frame sequence signals into the 6-layer residual network, and learns the at least one set of characteristic values by utilizing the 6-layer residual network, and obtains a standard characteristic value group corresponding to each control instruction, and saves the control instruction and the corresponding standard characteristic value group as a trained network model in .pkl format. When the terminal predicts a new gesture motion, the python script is invoked to import the trained network model, and the script is invoked by a Matlab program, and the python script returns a predicted classification result to the Matlab program after classifying and predicting the at least one set of signal characteristic values.

In the embodiment of the present application, the terminal matches the at least one set of signal characteristic values with the correspondence library of standard characteristic values and control instructions, and when the at least one set of signal characteristic values successfully matches with a first standard characteristic value group in the correspondence library of standard characteristic values and control instructions, the terminal searches for the first control instruction corresponding to the first standard characteristic value group from the correspondence library of standard characteristic values and control instructions. At this time, the terminal obtains the first control instruction corresponding to the gesture motion using the correspondence library of standard characteristic values and control instructions.

In the embodiment of the present application, the first control instruction is used to control the camera to implement the functions of photography, focusing, and the like, and the specific function is selected according to the actual situation, which is not specifically limited in the embodiment of the present application.

Exemplarily, when the terminal receives the initial state of right hand fingers naturally opened, the right forearm raised forward, and then the right arm elbow joint driving the forearm to lay flat toward the left side with the elbow joint taken as the axis, and a change in the gesture of the right hand making a fist during the process of laying flat, the terminal determines the first control instruction as controlling the camera to perform the photography.

S104. Controlling a first application to implement a corresponding function using the first control instruction.

After obtaining the first control instruction corresponding to the gesture motion, the terminal controls the first application to implement the corresponding function using the first control instruction.

In the embodiment of the present application, after obtaining the first control instruction, the terminal inputs the first control instruction into the Matlab program, and completes the function of controlling the camera using the Matlab program. Specifically, the adopted manner that the terminal uses the Matlab program to complete the function of controlling the camera is: the terminal invokes a Webcam module through the Matlab program; after the terminal obtains the first control instruction, the Matlab program transmits a control value corresponding to the first control instruction to the Webcam module; after receiving the control value, the Webcam module controls the camera to implement different functions according to different control values.

It should be noted that the Matlab program is used throughout the entire system. The Matlab program is used to store the signals collected by the millimeter wave apparatus, invoke the prediction script of Python for performing the prediction, and control the camera after obtaining the predicted value.

Figure 4:
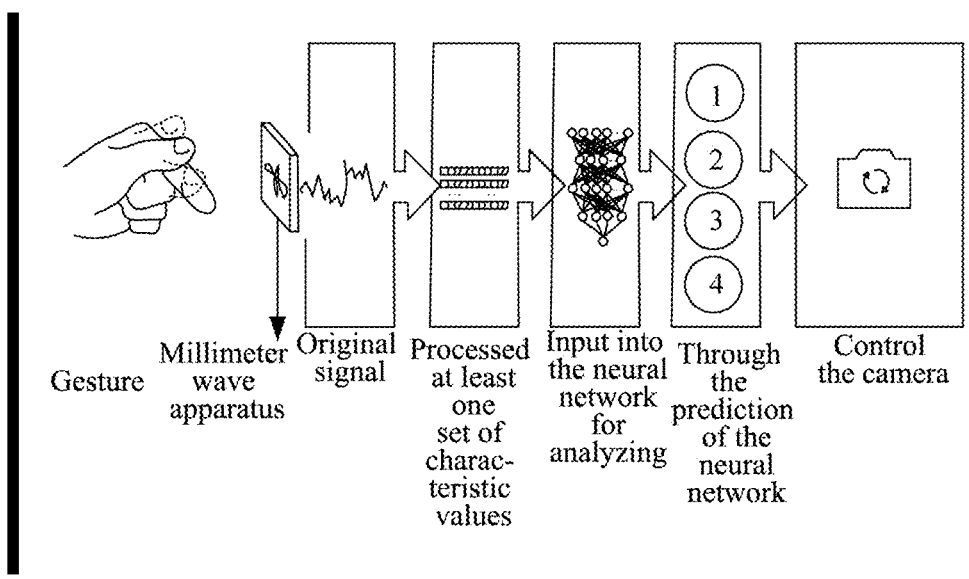
FIG. 4 is an architecture diagram of an exemplary control of gesture according to an embodiment of the present application.

Exemplarily, as shown in FIG. 4, the overall architecture of the gesture control is: the millimeter wave apparatus receives an original signal modulated via the standard gesture motion, and processes the original signal to obtain at least one set of characteristic values, and then, inputs the at least one set of characteristic values into the neural network for analyzing, after the prediction of the neural network, controls the camera to complete the corresponding function.

It can be understood that the terminal receives, through the millimeter wave apparatus, the first millimeter wave returned by the gesture motion, and processes the first millimeter wave based on the two types of time arrays according to the characteristic of small wavelength of the first millimeter wave, and utilizes Doppler estimation to obtain the at least one set of signal characteristic values corresponding to the processed first millimeter wave, and finally obtains the first control instruction corresponding to the gesture motion using the at least one set of signal characteristic values and the preset neural network, thereby the subtle gesture motion can be recognized, the accuracy of gesture perception is thus improved.

Embodiment 2

Figure 5:
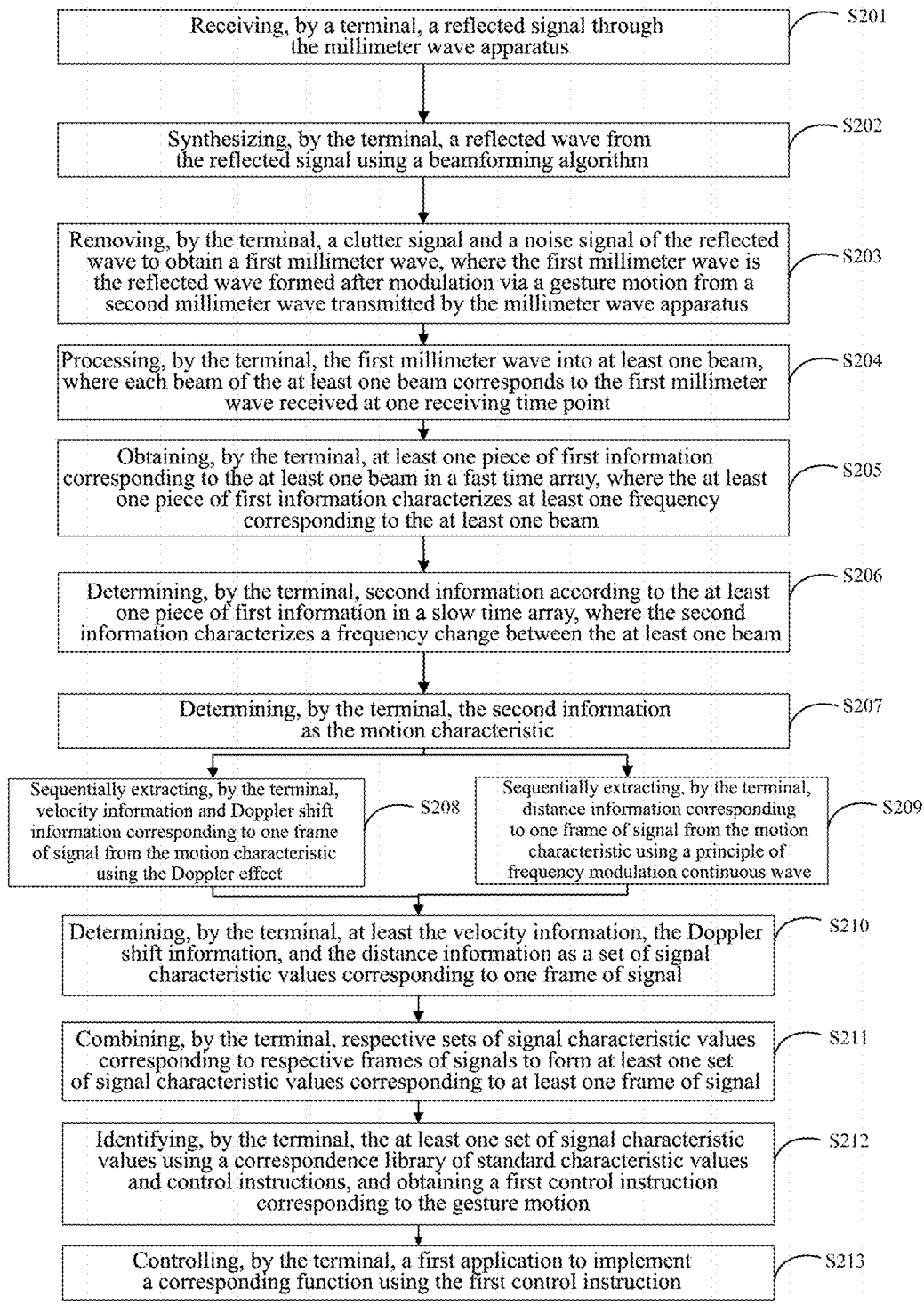
FIG. 5 is a second flowchart of a method for gesture recognition according to an embodiment of the present application.

The embodiment of the present application provides a method for gesture recognition, which is applied to a terminal, and a millimeter wave apparatus is disposed on the terminal. As shown in FIG. 5, the method may include:

S201. Receiving, by a terminal, a reflected signal through the millimeter wave apparatus.

The method for gesture recognition provided by the embodiment of the present application is applied to a scenario in which a gesture of a user is perceived to implement a contactless photography.

In the embodiment of the present application, the terminal may transmit a wireless signal through a transmitting antenna of the millimeter wave apparatus when a preset transmission time arrives, or the terminal may transmit the wireless signal through the transmitting antenna of the millimeter wave apparatus when a first application launched, and the specific timing at which the terminal transmits the wireless signal through the transmitting antenna of the millimeter wave apparatus is selected according to the actual situation, which is not specifically limited in the embodiment of the present application.

In the embodiment of the present application, the first application is a photographing application, a video shooting application, or the like, and is specifically selected according to the actual situation, which is not specifically limited in the embodiment of the present application.

In the embodiment of the present application, when the user clicks the application icon of the first application in the display interface of the application icon, the terminal receives a startup instruction for starting the first application, and at this time, the terminal starts the first application, and uses the millimeter wave apparatus to transmit the wireless signal.

In the embodiment of the present application, the millimeter wave apparatus includes the transmitting antenna and a receiving antenna, and the millimeter wave apparatus transmits the wireless signal using the transmitting antenna, and forms a reflected signal after modulation via a hand motion in a transmitting range of the wireless signal, and then the reflected signal is captured by the receiving antenna of the millimeter wave apparatus.

In the embodiment of the present application, the form of transmitting the wireless signal by the millimeter wave apparatus is periodically transmitting Frequency Modulated Continuous Wave (FMCW), so that the frequency changing rule of the first millimeter wave and that of the second millimeter wave are the same, which are both triangular wave rule, however there is only a time difference in between, and the terminal can use this small time difference to calculate the target distance.

S202. Synthesizing, by the terminal, a reflected wave from the reflected signal using a beamforming algorithm.

After receiving the reflected signal through the millimeter wave apparatus, the terminal synthesizes the reflected wave from the reflected signal using the beamforming algorithm.

In the embodiment of the present application, after the receiving antenna receives the reflected wave, the reflected wave is cached into an output cache area of an ADC, and then the millimeter wave apparatus moves the reflected wave from the output cache area of the ADC to a local memory of a DSP, and the terminal synthesizes the reflected wave from the reflected signal using a Capon beam former.

In the embodiment of the present application, a source signal is reconstructed from a sensor array using formula (1).

$$X(t)=A(\theta)s(t)+n(t) \quad (1)$$

where s(t) is an input signal after mixing the baseband signals.

In the embodiment of the present application, the static sundries is removed by removing the DC components of each distance receiver in a distance processing module, thereby eliminating reflections of static objects such as tables or chairs, etc. at the region of interest.

S203. Removing, by the terminal, a clutter signal and a noise signal of the reflected wave to obtain a first millimeter wave, where the first millimeter wave is the reflected wave formed after a second millimeter wave transmitted by the millimeter wave apparatus is modulated via a gesture motion.

After synthesizing the reflected wave from the reflected signal, the terminal removes the clutter signal and the noise signal in the reflected wave, thereby obtaining the first millimeter wave.

In the embodiment of the present application, a first channel in a distance domain and a second channel in an angle domain are processed using a Constant False-Alarm Rate (CFAR) detection algorithm, and the second channel confirms the result of the first channel, thereby removing clutter and noise, and determining the detection point, thus obtaining the first millimeter wave.

S204. Processing, by the terminal, the first millimeter wave into at least one beam, where each beam of the at least one beam corresponds to the first millimeter wave received at one receiving time point.

After obtaining the first millimeter wave, the terminal processes the first millimeter wave into at least one beam, where each beam of the at least one beam corresponds to the first millimeter wave received at one receiving time point.

In the embodiment of the present application, the terminal divides the first millimeter wave into at least one beam corresponding to at least one receiving time point.

S205. Obtaining, by the terminal, at least one piece of first information corresponding to the at least one beam in a fast time array, where the at least one piece of first information characterizes at least one frequency corresponding to the at least one beam.

After processing the first millimeter wave into the at least one beam, the terminal obtains at least one piece of first information corresponding to the at least one beam in the fast time array.

In the embodiment of the present application, the terminal calculates the at least one piece of first information corresponding to the at least one beam based on the principle of a short time scale perception, where the at least one piece of first information is used to characterize the at least one frequency corresponding to the at least one beam.

In this case, the principle of short time scale perception is that the high radar repetition frequency links the scattering center hand model with the signal processing method, for a high velocity radar frequency which is high enough and a hand motion which is relatively slow, the scattering center model is approximately constant within a single radar repetition interval, where the scattering center range and reflectivity are functions that closely follow the change of the short term scale T. The hand is illuminated with a single wide beam in each transmission cycle, and all the scattering centers on the hand simultaneously reflect the signal, and the measurement waveform consists of the reflection of each scattering center and is superimposed in the fast time, where each individual reflection waveform has instantaneous reflectivity and range modulation of the relevant scattering center; after RF demodulation and modulation of specific filtered wave, the preprocessed received signal represents the superposition of the responses from respective scattering centers. The high radar repetition frequency is capable of, in the slow time, capturing fine phase changes in the received signal corresponding dynamically to the scattering center.

S206. Determining, by the terminal, second information according to the at least one piece of first information in a slow time array, where the second information characterizes a frequency change between the at least one beam.

After obtaining the at least one piece of first information corresponding to the at least one beam in the fast time array, the terminal determines the second information according to the at least one piece of first information in the slow time array, where the second information characterizes the frequency change between the at least one beam.

In the embodiment of the present application, the terminal calculates the second information that characterizes the frequency change between the at least one beam based on the principle of a long time scale perception.

In this case, the principle of long time scale perception is that when the scattering center moves, the relative displacement of the scattering center may generate a phase change proportional to the wavelength. The dependence of the phase change on the displacement allows the millimeter wave apparatus to find the scattered scattering center in the slow time according to its phase. Assuming that the velocity of each scattering center is approximately constant over some coherent processing time greater than the radar repetition interval, the phase over the coherent processing time then generates a Doppler frequency, thus the Doppler frequencies of multiple scattering centers moving at different velocities can be analyzed by calculating the spectrum of the waveform of each fast time window over the coherent processing slow time window.

Specifically, the terminal applies FFT to each fast time array over the slow time array to obtain a frequency information. The resulting fast time-frequency mapping is converted to distance and velocity by transformation. Fine adjustments can be made to the desired hand dynamics and desired sensing performance based on SNR, velocity resolution, and Doppler aliasing. Therefore, a frequency change information of the at least one beam is determined, where the frequency change information characterizes the distance and rate of the multi-center of the hand which change over the time.

S207. Determining, by the terminal, the second information as the motion characteristic.

After determining the second information, the terminal determines the second information as a motion characteristic corresponding to the first millimeter wave.

In the embodiment of the present application, the terminal takes the distance and rate of the multi-center of the hand which change over time as a motion characteristic.

In the embodiment of the present application, the terminal buffers a certain number of consecutive pre-processed radar signals in the fast time array and the slow time array for characterizing the motion characteristic.

S208. Sequentially extracting, by the terminal, velocity information and Doppler shift information corresponding to one frame of signal from the motion characteristic using the Doppler effect.

After determining the second information as the motion characteristic, the terminal extracts the velocity information and the Doppler shift information corresponding to the one frame of signal from the motion characteristic using the Doppler effect.

In the embodiment of the present application, the terminal determines the motion characteristic as at least one frame of signal, and then sequentially processes one frame of signal out of the at least one frame of signal using the Doppler effect, so as to sequentially extract the corresponding velocity information and Doppler shift information from one frame of signal.

In the embodiment of the present application, the Doppler effect refers to that the wavelength of the object radiation changes due to the relative motion of the light source and the observer. In front of a moving wave source, the wave is compressed, the wavelength becomes shorter, and the frequency becomes higher; and in the back of the moving wave source, the opposite effect is generated, where the wavelength becomes longer, and the frequency becomes lower. The higher the velocity of the wave source, the greater the resulting effect is, a velocity information of the wave source motion in the direction of observation can be calculated according to the degree of red/blue shift of the light wave.

Figure 6:
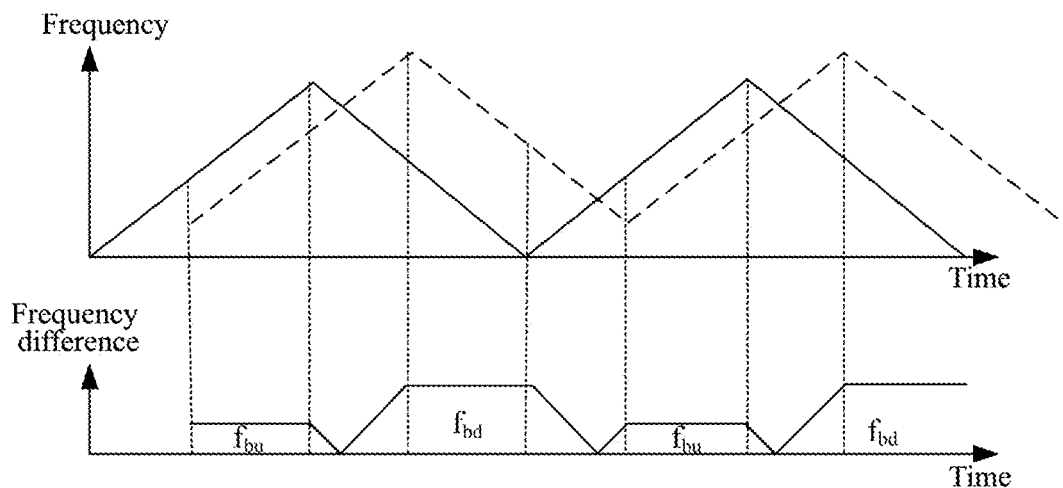
FIG. 6 is a schematic diagram of an exemplary Frequency Modulated Continuous Wave according to an embodiment of the present application.

In the embodiment of the present application, since the millimeter wave apparatus transmits a frequency modulated continuous wave, the change rules of the frequency the second millimeter wave and the first millimeter wave are both in conformity with the triangular wave rule. Therefore, according to the Doppler effect, the frequency difference is shown in FIG. 6, where the solid line in the frequency-time coordinate is a frequency change curve of a transmitted wave, and the dashed line is a frequency change curve of a received wave; fb is a frequency difference when the detected object is stationary, and fd is the Doppler shift when the detected object moves.

S209. Sequentially extracting, by the terminal, distance information corresponding to one frame of signal from the motion characteristic using a principle of frequency modulation continuous wave.

After determining the second information as the motion characteristic, the terminal sequentially extracts the distance information corresponding to the one frame of signal from the motion characteristic using the principle of Frequency Modulation Continuous Wave.

In the embodiment of the present application, the terminal determines the motion characteristic as at least one frame of signal, and then sequentially processes one frame of signal of the at least one frame of signal using the principle of frequency modulation continuous wave to sequentially extract the corresponding distance information from one frame of signal.

In the embodiment of the present application, the form in which the millimeter wave apparatus transmits the millimeter wave enables the calculation of the distance between the relative targets. The basic principle is that the transmitted wave is a high-frequency continuous wave whose frequency changes with time according to the rule of the triangle wave. The change rule of the frequency of the echo received by the radar and the change rule of the frequency of the transmitted wave are the same, which are both triangular wave rule. However, there is only a time difference in between, and the distance information can be calculated using this small time difference.

Figure 7:
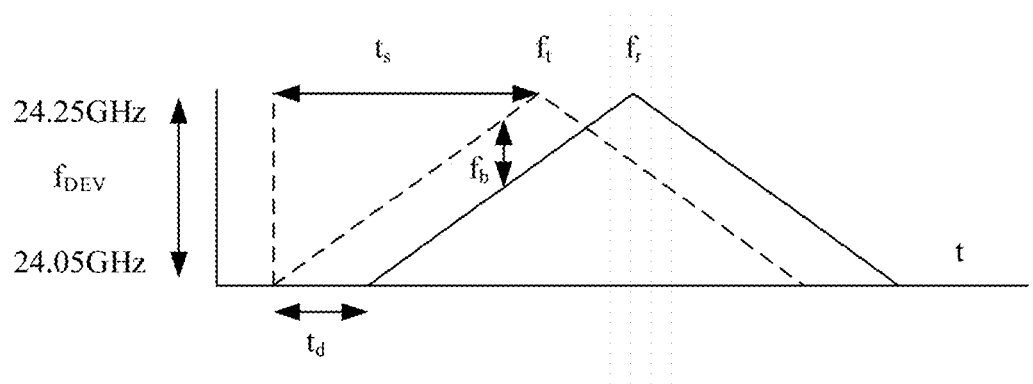
FIG. 7 is a schematic diagram of an exemplary Doppler shift according to an embodiment of the present application.
Figure 8:
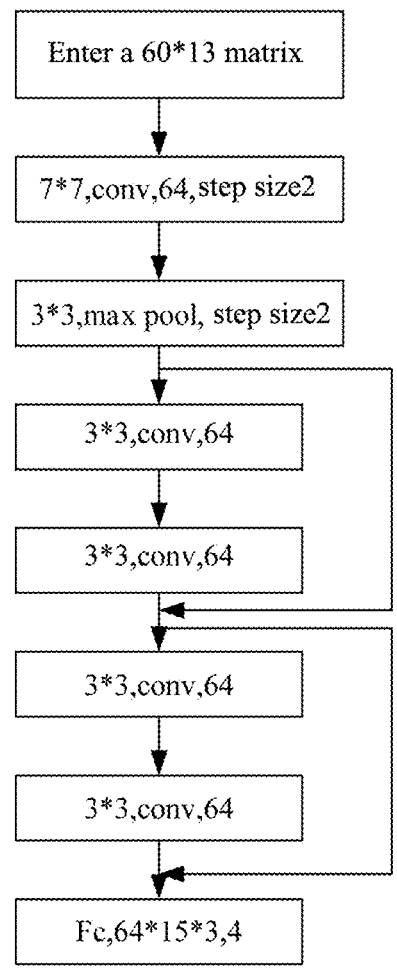
FIG. 8 is a schematic diagram of an exemplary convolutional neural network model according to an embodiment of the present application.

As shown in FIG. 7, the dashed line is the frequency change curve of a transmitted wave, and the solid line is the frequency change curve of the received wave, where td is the time difference between ft and fr, ft is the frequency of the transmitted wave, and fr is the frequency of the received wave.

S208 and S209 are two parallel steps after S207, and the specific execution order is selected according to the actual situation, which will not be limited in the embodiment of the present application.

S210. Determining, by the terminal, at least the velocity information, the Doppler shift information, and the distance information as a set of signal characteristic values corresponding to one frame of signal.

After extracting the velocity information, the Doppler shift information, and the distance information, the terminal determines at least the velocity information, the Doppler shift information, and the distance information as the set of signal characteristic values corresponding to one frame of signal.

In the embodiment of the present application, one frame of signal includes a set of signal characteristic values related to the velocity information, the Doppler shift information, and the distance information.

In the embodiment of the present application, each frame of signal is composed of at least 11 characteristic values related to the velocity information, the Doppler frequency shift information, and the distance information. As shown in FIG. 3, the 11 characteristic values include: num_detection, Doppler_average, range_average, magnitude_sum, positive num_detetion, range_index, negative num_detection, negative doppler_average, range_disp, angle_value, and prediction_result.

S211. Combining, by the terminal, respective sets of signal characteristic values corresponding to respective frames of signals to form at least one set of signal characteristic values corresponding to at least one frame of signal.

After determining the set of signal characteristic values corresponding to the one frame of signal, the terminal combines respective sets of signal characteristic values corresponding to respective frames of signal to form the at least one set of signal characteristic values corresponding to the at least one frame of signal.

In the embodiment of the present application, the terminal sequentially determines each set of signal characteristic values corresponding to each frame of signal, and then, combines the respective sets of signal characteristic values corresponding to the respective frames of signals to form the at least one set of signal characteristic values corresponding to at least one frame of signal.

S212. Identifying, by the terminal, the at least one set of signal characteristic values using a correspondence library of standard characteristic values and control instructions, and obtaining a first control instruction corresponding to the gesture motion.

After obtaining the correspondence library of standard characteristic values and control instructions, the terminal classifies and predicts the at least one set of signal characteristic values using the correspondence library of standard characteristic values and control instructions.

In the embodiment of the present application, the terminal searches for a first standard signal characteristic value corresponding to the at least one set of signal characteristic values from the correspondence library of standard characteristic values and control instructions, and determines the first control instruction corresponding to the first standard signal characteristic value, where the correspondence library of standard characteristic values and control instructions is a relational library obtained through the learning by a preset neural network.

In the embodiment of the present application, the terminal uses a Matlab program to invoke a python script, so as to import a trained network model (the correspondence library of standard characteristic values and control instructions). The python script returns the result value of the classification and prediction to the Matlab program after classifying and predicting the at least one set of signal characteristic values.

S213. Controlling, by the terminal, a first application to implement a corresponding function using the first control instruction.

After obtaining the first control instruction, the terminal controls the first application to implement the corresponding function using the first control instruction.

In the embodiment of the present application, after obtaining the first control instruction, the terminal inputs the first control instruction into the Matlab program, and completes the function of controlling the camera using the Matlab program. Specifically, the manner in which the terminal uses the Matlab program to complete the function of controlling the camera is: the terminal invokes a Webcam module through the Matlab program; after the terminal obtains the first control instruction, the Matlab program transmits a control value corresponding to the first control instruction to the Webcam module; after receiving control values, the Webcam module controls the camera to implement different functions according to different control values.

It should be noted that the Matlab program is used throughout the entire system. The Matlab program is used to store the signals collected by the millimeter wave apparatus, invoke the prediction script of Python for performing the prediction, and control the camera after obtaining the predicted value.

Figure 9:
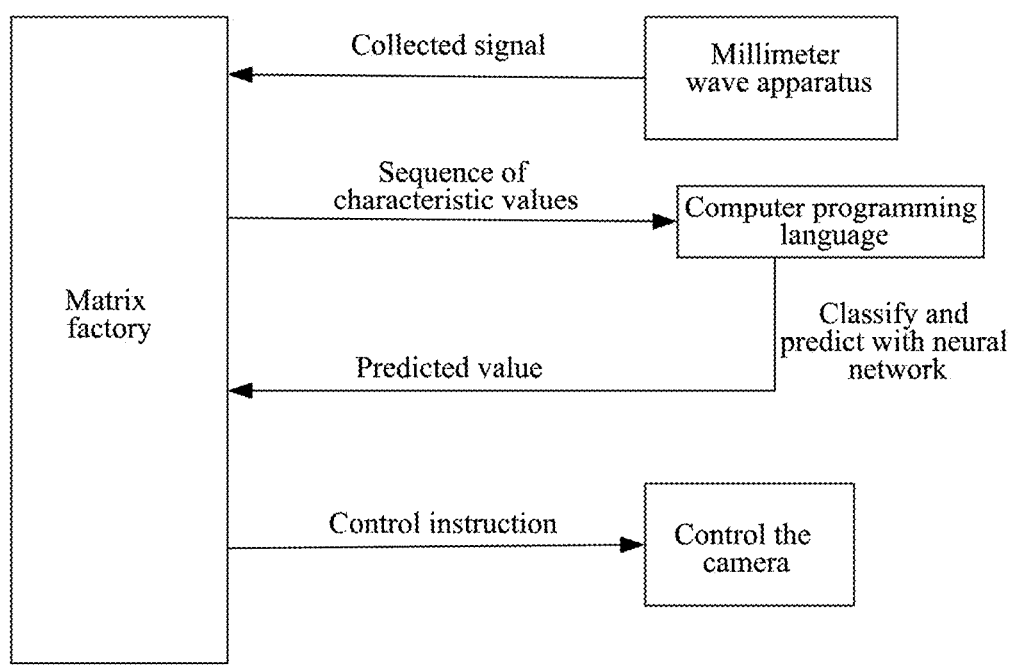
FIG. 9 is a flowchart of an exemplary gesture recognition based on a Matlab program according to an embodiment of the present application.

Exemplarily, as shown in FIG. 9, the Matlab program is used throughout the entire system, and the millimeter wave apparatus transmits the collected signal to the Matlab program; the Matlab program stores the signal collected by the millimeter wave apparatus, invokes the prediction script of Python to perform prediction, and controls the camera after obtaining the predicted value.

It can be understood that the terminal receives the first millimeter wave returned by the gesture motion through the millimeter wave apparatus, and processes the first millimeter wave based on the two types of time arrays according to the characteristic of small wavelength of the first millimeter wave, and utilizes Doppler estimation to obtain the at least one set of signal characteristic values corresponding to the processed first millimeter wave, and finally obtains the first control instruction corresponding to the gesture motion using the at least one set of signal characteristic values and the preset neural network, thereby subtle gesture motion can be recognized and the accuracy of gesture perception is increased.

Based on the above embodiment 2, in the embodiment of the present application, the above terminal further learns with the preset neural network in real time when performing gesture recognition, and obtains the correspondence library of standard characteristic values and control instructions, and the method for performing gesture recognition by the terminal may further include the following steps:

S301. Obtaining, by the terminal, a preset number of standard frame signals corresponding to a standard gesture motion.

In the embodiment of the present application, the terminal predetermines a time period required for collecting one standard gesture motion, and then determines the number of standard frame signals corresponding to the time period.

Exemplarily, time period required for collecting one standard gesture motion is 2 seconds, and the number of standard frame signals that can be collected in 2 seconds is 60.

Figure 10:
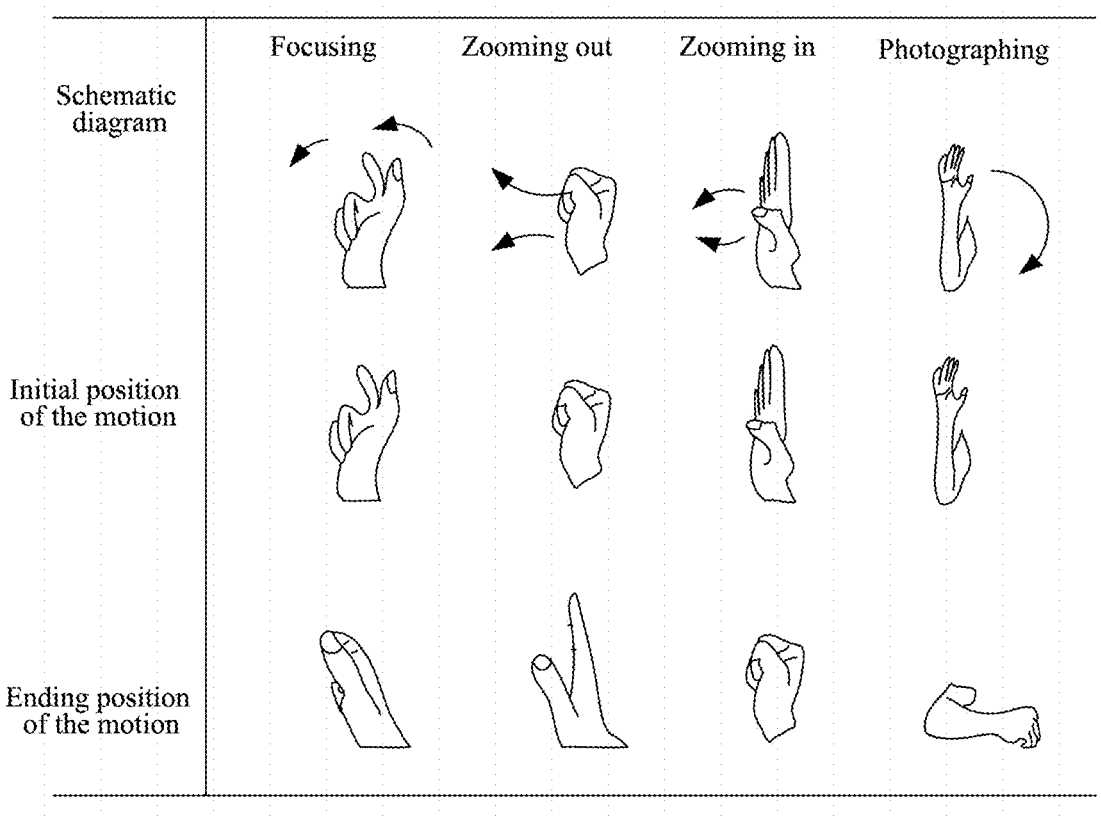
FIG. 10 is a schematic diagram of an exemplary gesture motion according to an embodiment of the present application.

Exemplarily, the terminal obtains four standard gestures that control the camera to implement different functions, as shown in FIG. 10.

Gesture 1—Focusing: bending the middle finger, ring finger, and little finger of the right hand to make the fingertip touch the center of the palm, extending the index finger and thumb to form a ellipse, separating the fingertip of the two fingers, opening the purlicue, forming a bevel angle with the forearm of the right hand and the ground, moving the wrist up and down to drive the right hand to make two knocks.

Gesture 2—Zooming in: making a fist, moving the hand forward and horizontally toward the TI device and opening the fingers during the movement.

Gesture 3—Zooming out: opening the finger naturally, moving the hand forward and toward the millimeter wave apparatus, and making a fist during the movement.

Gesture 4—Photographing: naturally opening the fingers of the right hand, raising the forearm of the right hand forward, so that the back side of the forearm is directly facing the millimeter wave apparatus, and the right arm elbow joint driving the forearm to lay flat toward the left side with the elbow joint taken as the axis, and making a fist by the right hand during the process of laying flat.

S302. Determining, by the terminal, a preset number of standard signal characteristic values corresponding to the preset number of standard frame signals.

After obtaining a preset number of standard frame signals corresponding to the standard gesture motion, the terminal determines the preset number of standard signal characteristic values corresponding to the preset number of standard frame signals.

In the embodiment of the present application, the terminal processes the standard gesture motion to obtain a set of frame sequence signals corresponding to the standard gesture motion, where each frame sequence signal in the set of frame sequence signals corresponds to a set of characteristic values.

Exemplarily, each frame sequence signal includes 11 characteristic values related to angle, distance, and Doppler shift.

S303: Performing, by the terminal, learning of the preset number of standard signal characteristic values using the preset neural network to obtain the correspondence library of standard characteristic values and control instructions.

After determining the preset number of standard signal characteristic values corresponding to the preset number of standard frame signals, the terminal learns the preset number of standard signal characteristic values using the preset neural network, and obtains the correspondence library of standard characteristic values and control instructions.

In an implementation, the preset neural network is a 6-layer residual network obtained after removing the last three layers of the residual network resnet18.

In the embodiment of the present application, the terminal inputs the at least one set of characteristic values corresponding to the set of frame sequence signals into the 6-layer residual network, and learns the at least one set of characteristic values using the 6-layer residual network, obtains the standard characteristic value group corresponding to each control instruction, and saves the control instruction and the corresponding standard characteristic value group as the trained network model in .pkl format.

Embodiment 3

Figure 11:
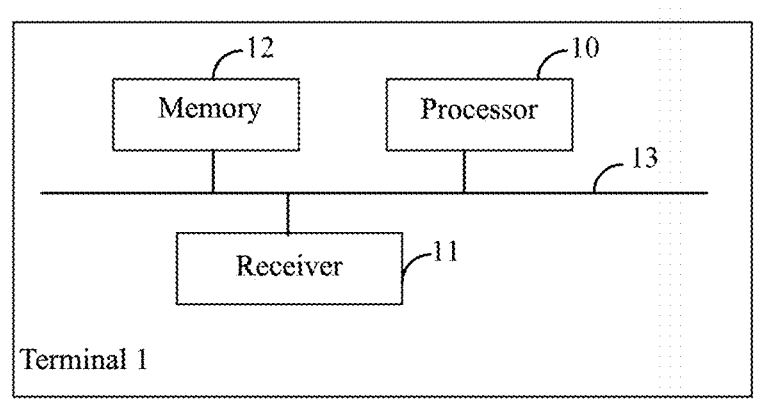
FIG. 11 is a schematic structural diagram of a terminal according to an embodiment of the present application.

FIG. 11 is a first schematic diagram of the composition and structure of the terminal according to an embodiment of the present application. A millimeter wave apparatus is disposed on the terminal. In the practical application, based on the same inventive concept of the first embodiment and the second embodiment, as shown in FIG. 11, the terminal 1 of the embodiment of the present application includes: a processor 10, a receiver 11, a memory 12, and a communication bus 13. In a process of the specific embodiment, the above processor 10 may be at least one of an Application Specific Integrated Circuit (ASIC), a Digital Signal Processor (DSP), or a Digital Signal Processing Device (DSPD), a Programmable Logic Device (PLD), a Field Programmable Gate Array (FPGA), a CPU, a controller, a microcontroller, and a microprocessor. It is to be understood that, for different devices, the electronic device for implementing the functions of the above processor may be other device, which is not specifically limited in the embodiment of the present application.

In the embodiment of the present application, the above communication bus 13 is configured to implement the connection communication among the processor 10, the receiver 11 and the memory 12; the above receiver 11 is configured to receive the first millimeter wave through the millimeter wave apparatus, where the first millimeter wave is the reflected wave formed after a second millimeter wave transmitted by the millimeter wave apparatus is modulated via a gesture motion; the above processor 10 is configured to execute an operating program stored in the memory 12 to implement the following steps:

processing the first millimeter wave based on two types of time arrays and Doppler estimation and obtaining the at least one set of signal characteristic values corresponding to the first millimeter wave, where each set of signal characteristic values of the at least one set of signal characteristic values correspond to one frame of signal in the first millimeter wave; identifying the at least one set of signal characteristic values using the correspondence library of standard characteristic values and control instructions, and obtaining the first control instruction corresponding to the gesture motion; controlling the first application to implement the corresponding function using the first control instruction.

In the embodiment of the present application, the above processor 10 is further configured to process the first millimeter wave based on the two types of time arrays to obtain the motion characteristic corresponding to the gesture motion, where the motion characteristic characterizes the displacement information of the gesture motion; extract the at least one set of signal characteristic values from the motion characteristic based on the Doppler estimation, where each set of signal characteristic values of the at least one set of signal characteristic values corresponds to one frame of signal in the characterization of the motion characteristic.

In the embodiment of the present application, further, the two types of time arrays include the fast time array and the slow time array; the above processor 10 is further configured to process the first millimeter wave into at least one beam, where each beam of the at least one beam corresponds to the first millimeter wave received at the receiving time point; obtain at least one piece of first information corresponding to the at least one beam in the fast time array, where the at least one piece of first information characterizes at least one frequency corresponding to the at least one beam; determine the second information according to the at least one piece of first information in the slow time array, where the second information characterizes the frequency change between the at least one beam; determine the second information as the motion characteristic.

In the embodiment of the present application, further, the above processor 10 is further configured to sequentially extract the velocity information and the Doppler shift information corresponding to the one frame of signal from the motion characteristic using the Doppler effect; sequentially extract the distance information corresponding to the one frame of signal from the motion characteristic using the principle of frequency modulation continuous wave; and determine at least the velocity information, the Doppler shift information, and the distance information as the set of signal characteristic values corresponding to the one frame of signal; combine respective sets of signal characteristic values corresponding to respective frames of signals to form the at least one set of signal characteristic values corresponding to the at least one frame of signal.

In the embodiment of the present application, further, the above processor 10 is further configured to obtain the preset number of standard frame signals corresponding to the standard gesture motion, and determine the preset number of standard signal characteristic values corresponding to the preset number of standard frame signals; learn the preset number of standard signal characteristic values using the preset neural network to obtain the correspondence library of standard characteristic values and control instructions.

In the embodiment of the present application, further, the above processor 10 is further configured to receive the reflected signal through the millimeter wave apparatus; synthesize a reflected wave from the reflected signal into the using a beamforming algorithm; and remove the clutter signal and the noise signal of the reflected wave to obtain the first millimeter wave.

In the embodiment of the present application, further, the correspondence library of standard characteristic values and control instructions is a relational library obtained through the learning by the preset neural network.

The terminal proposed by the embodiments of the present application receives the first millimeter wave through the millimeter wave apparatus, where the first millimeter wave is the reflected wave formed after a second millimeter wave transmitted by the millimeter wave apparatus is modulated via a gesture motion; processes the first millimeter wave based on the two types of time arrays and the Doppler estimation to obtain the at least one set of signal characteristic values corresponding to the first millimeter wave, where each set of signal characteristic values of the at least one set of signal characteristic values correspond to one frame of signal in the first millimeter wave; identifies the at least one set of signal characteristic values using the correspondence library of standard characteristic values and control instructions to obtain the first control instruction corresponding to the gesture motion; and controls the first application to implement the corresponding function using the first control instruction. It can be seen that, the terminal proposed by the embodiment of the present application receives, through the millimeter wave apparatus, the first millimeter wave modulated via the gesture motion, and processes the first millimeter wave based on the two types of time arrays according to the characteristic of small wavelength of the first millimeter wave, and obtains the at least one set of signal characteristic values corresponding to the processed first millimeter wave using the Doppler estimation, and finally obtains the first control instruction corresponding to the gesture motion using the at least one set of signal characteristic values and the correspondence library of standard characteristic values and control instructions, thereby the subtle gesture motion can be identified, and the accuracy of the gesture perception is improved.

The embodiment of the present application provides a storage medium, where the storage medium stores one or more programs, and the one or more programs may be executed by one or more processors, and the storage medium is applied in a terminal, and when the programs are executed by the processor, the methods as described in the first embodiment and the second embodiment are implemented.

It is to be explained that the term "includes", "including", or any other variants thereof, are intended to contain a non-exclusive inclusion, such that a process, method, item, or system which include a series of elements do not only include those elements, but also include other elements that are not explicitly listed, or also include elements that are inherent to such process, method, item, or system. In the case of no more limitations, an element defined by the phrase "including a . . . " does not exclude the presence of additional identical elements in a process, method, item, or system that includes this element.

The serial numbers of the embodiments of the present application are merely for the description, and do not represent the advantages and disadvantages of the embodiments.

Through the description of the above implementations, those skilled in the art can clearly understand that the foregoing embodiments of the methods can be implemented by means of software plus a necessary general hardware platform, and of course, can also be implemented through hardware, but in many cases, the former is the better implementation. Based on such understanding, the technical solution of the present disclosure, essentially or the part that contributes to the prior art, may be embodied in the form of a software product, where the software product of the computer is stored in a storage medium (such as the ROM/RAM, disk, optical disk), and includes a number of instructions for causing a terminal (which may be a cell phone, a computer, a server, an air conditioner, a network device, or the like) to perform the methods described in various embodiments of the present disclosure.

The embodiments of the present disclosure have been described above in combination with the drawings, but the present disclosure is not limited to the specific embodiments described above, and the specific embodiments described above are merely illustrative and not restrictive, and under the enlightenment of the present disclosure. Those skilled in the art can further make many forms without departing from the spirit of the present disclosure and the scope as claimed by the claims of the present disclosure, and these forms are all within the protection of the present disclosure.

INDUSTRIAL APPLICABILITY

In the embodiments of the present application, a terminal receives, through a millimeter wave apparatus, a first millimeter wave returned by a gesture motion, and processes the first millimeter wave based on two types of time arrays according to the characteristic of small wavelength of the first millimeter wave, and obtains at least one set of signal characteristic values corresponding to the processed first millimeter wave using the Doppler estimation, and finally obtains a first control instruction corresponding to the gesture motion using the at least one set of signal characteristic values and a preset neural network, thereby subtle gesture motion can be identified, and the accuracy of gesture perception is thus improved.

What is claimed is:

1. A method for gesture recognition, wherein the method is applied to a terminal, and the terminal is provided with a millimeter wave apparatus, the method comprising:
   receiving, through the millimeter wave apparatus, a first millimeter wave, wherein the first millimeter wave is a reflected wave formed after a second millimeter wave transmitted by the millimeter wave apparatus is modulated via a gesture motion;
   processing the first millimeter wave based on two types of time arrays and Doppler estimation to obtain at least one set of signal characteristic values corresponding to the first millimeter wave, wherein each set of signal characteristic values of the at least one set of signal characteristic values correspond to one frame of signal in the first millimeter wave;
   identifying the at least one set of signal characteristic values using a correspondence library of standard characteristic values and control instructions, and obtaining a first control instruction corresponding to the gesture motion; and
   controlling a first application to implement a corresponding function using the first control instruction.

2. The method according to claim 1, wherein the processing the first millimeter wave based on two types of time arrays and Doppler estimation to obtain at least one set of signal characteristic values corresponding to the first millimeter wave comprises:
   processing the first millimeter wave based on the two types of time arrays to obtain a motion characteristic corresponding to the gesture motion, wherein the motion characteristic characterizes displacement information of the gesture motion;
   extracting the at least one set of signal characteristic values from the motion characteristic based on the Doppler estimation, wherein each set of signal characteristic values of the at least one set of signal characteristic values correspond to one frame of signal of the characterization of the motion characteristic.

3. The method according to claim 2, wherein the two types of time arrays comprise a fast time array and a slow time array; the processing the first millimeter wave based on the two types of time arrays to obtain a motion characteristic corresponding to the gesture motion comprises:

processing the first millimeter wave into at least one beam, wherein each beam of the at least one beam corresponds to the first millimeter wave received at one receiving time point;

obtaining at least one piece of first information corresponding to the at least one beam in the fast time array, wherein the at least one piece of first information characterizes at least one frequency corresponding to the at least one beam;

determining second information according to the at least one piece of first information in the slow time array, wherein the second information characterizes a frequency change between the at least one beam; and determining the second information as the motion characteristic.

4. The method according to claim 2, wherein the extracting the at least one set of signal characteristic values from the motion characteristic based on the Doppler estimation comprises:

sequentially extracting velocity information and Doppler shift information corresponding to the one frame of signal from the motion characteristic using a Doppler effect;

sequentially extracting distance information corresponding to the one frame of signal from the motion characteristic using a principle of frequency modulation continuous wave;

determining at least the velocity information, the Doppler shift information, and the distance information as one set of signal characteristic values corresponding to the one frame of signal; and combining respective sets of signal characteristic values corresponding to respective frames of signals into the at least one set of signal characteristic values corresponding to the at least one frame of signal.

5. The method according to claim 1, wherein the method further comprises:

obtaining a preset number of standard frame signals corresponding to a standard gesture motion;

determining a preset number of standard signal characteristic values corresponding to the preset number of standard frame signals;

performing learning of the preset number of standard signal characteristic values using a preset neural network to obtain the correspondence library of standard characteristic values and control instructions.

6. The method according to claim 1, wherein the receiving, through the millimeter wave apparatus, a first millimeter wave, comprises:

receiving a reflected signal through the millimeter wave apparatus;

synthesizing a reflected wave from the reflected signal using a beamforming algorithm; and removing a clutter signal and a noise signal of the reflected wave to obtain the first millimeter wave.

7. The method according to claim 1, wherein the correspondence library of standard characteristic values and control instructions is a relational library obtained through learning by a preset neural network.

8. A terminal, comprising: a processor, a receiver, a memory, and a communication bus, wherein the terminal is provided with a millimeter wave apparatus, and the receiver is configured to receive a first millimeter wave through the millimeter wave apparatus, wherein the first millimeter wave is a reflected wave formed after a second millimeter wave transmitted by the millimeter wave apparatus is modulated via a gesture motion; wherein the processor is configured to execute an operating program stored in the memory to implement the following steps:

processing the first millimeter wave based on two types of time arrays and Doppler estimation to obtain at least one set of signal characteristic values corresponding to the first millimeter wave, wherein each set of signal characteristic values of the at least one set of signal characteristic values correspond to one frame of signal in the first millimeter wave; identifying the at least one set of signal characteristic values using a correspondence library of standard characteristic values and control instructions, and obtaining a first control instruction corresponding to the gesture motion; and controlling a first application to implement a corresponding function using the first control instruction.

9. The terminal according to claim 8, wherein the processor is further configured to:

process the first millimeter wave based on the two types of time arrays to obtain a motion characteristic corresponding to the gesture motion, wherein the motion characteristic characterizes displacement information of the gesture motion; and extract the at least one set of signal characteristic values from the motion characteristic based on the Doppler estimation, wherein each set of signal characteristic values of the at least one set of signal characteristic values correspond to one frame of signal of the characterization of the motion characteristic.

10. The terminal according to claim 9, wherein the two types of time arrays comprise a fast time array and a slow time array;

the processor is further configured to:

process the first millimeter wave into at least one beam, wherein each beam of the at least one beam corresponds to the first millimeter wave received at one receiving time point;

obtain at least one piece of first information corresponding to the at least one beam in the fast time array, wherein the at least one piece of first information characterizes at least one frequency corresponding to the at least one beam;

determine second information according to the at least one piece of first information in the slow time array, wherein the second information characterizes a frequency change between the at least one beam; and determine the second information as the motion characteristic.

11. The terminal according to claim 9, wherein the processor is further configured to:

sequentially extract velocity information and Doppler shift information corresponding to the one frame of signal from the motion characteristic using a Doppler effect;

sequentially extract distance information corresponding to the one frame of signal from the motion characteristic using a principle of frequency modulation continuous wave;

determine at least the velocity information, the Doppler shift information, and the distance information as one set of signal characteristic values corresponding to the one frame of signal; and combine respective sets of signal characteristic values corresponding to respective frames of signals into the at least one set of signal characteristic values corresponding to the at least one frame of signal.

12. The terminal according to claim 8, wherein the processor is further configured to:

obtain a preset number of standard frame signals corresponding to a standard gesture motion;
determine a preset number of standard signal characteristic values corresponding to the preset number of standard frame signals; and
perform learning of the preset number of standard signal characteristic values using a preset neural network to obtain the correspondence library of standard characteristic values and control instructions.

13. The terminal according to claim 8, wherein the processor is further configured to:
receive a reflected signal through the millimeter wave apparatus;
synthesize a reflected wave from the reflected signal using a beamforming algorithm; and
remove a clutter signal and a noise signal of the reflected wave to obtain the first millimeter wave.

14. The terminal according to claim 8, wherein the correspondence library of standard characteristic values and control instructions is a relational library obtained through learning by a preset neural network.

15. A non-transitory storage medium, on which a computer program is stored, wherein the storage medium is applied to a terminal, and when executed by a processor, the computer program causes the terminal to perform the following steps:
receiving, through the millimeter wave apparatus, a first millimeter wave, wherein the first millimeter wave is a reflected wave formed after a second millimeter wave transmitted by the millimeter wave apparatus is modulated via a gesture motion;
processing the first millimeter wave based on two types of time arrays and Doppler estimation to obtain at least one set of signal characteristic values corresponding to the first millimeter wave, wherein each set of signal characteristic values of the at least one set of signal characteristic values correspond to one frame of signal in the first millimeter wave;
identifying the at least one set of signal characteristic values using a correspondence library of standard characteristic values and control instructions, and obtaining a first control instruction corresponding to the gesture motion; and
controlling a first application to implement a corresponding function using the first control instruction.

16. The non-transitory storage medium according to claim 15, wherein the processing the first millimeter wave based on two types of time arrays and Doppler estimation to obtain at least one set of signal characteristic values corresponding to the first millimeter wave comprises:
processing the first millimeter wave based on the two types of time arrays to obtain a motion characteristic corresponding to the gesture motion, wherein the motion characteristic characterizes displacement information of the gesture motion;
extracting the at least one set of signal characteristic values from the motion characteristic based on the Doppler estimation, wherein each set of signal characteristic values of the at least one set of signal characteristic values correspond to one frame of signal of the characterization of the motion characteristic.

17. The non-transitory storage medium according to claim 16, wherein the two types of time arrays comprise a fast time array and a slow time array; the processing the first millimeter wave based on the two types of time arrays to obtain a motion characteristic corresponding to the gesture motion comprises:
processing the first millimeter wave into at least one beam, wherein each beam of the at least one beam corresponds to the first millimeter wave received at one receiving time point;
obtaining at least one piece of first information corresponding to the at least one beam in the fast time array, wherein the at least one piece of first information characterizes at least one frequency corresponding to the at least one beam;
determining second information according to the at least one piece of first information in the slow time array, wherein the second information characterizes a frequency change between the at least one beam; and
determining the second information as the motion characteristic.

18. The non-transitory storage medium according to claim 16, wherein the extracting the at least one set of signal characteristic values from the motion characteristic based on the Doppler estimation comprises:
sequentially extracting velocity information and Doppler shift information corresponding to the one frame of signal from the motion characteristic using a Doppler effect;
sequentially extracting distance information corresponding to the one frame of signal from the motion characteristic using a principle of frequency modulation continuous wave;
determining at least the velocity information, the Doppler shift information, and the distance information as one set of signal characteristic values corresponding to the one frame of signal; and
combining respective sets of signal characteristic values corresponding to respective frames of signals into the at least one set of signal characteristic values corresponding to the at least one frame of signal.

19. The non-transitory storage medium according to claim 15, wherein the computer program further causes the terminal to perform the following steps:
obtaining a preset number of standard frame signals corresponding to a standard gesture motion;
determining a preset number of standard signal characteristic values corresponding to the preset number of standard frame signals; and
performing learning of the preset number of standard signal characteristic values using a preset neural network to obtain the correspondence library of standard characteristic values and control instructions.

20. The non-transitory storage medium according to claim 15, wherein the receiving, through the millimeter wave apparatus, a first millimeter wave, comprises:
receiving a reflected signal through the millimeter wave apparatus;
synthesizing a reflected wave from the reflected signal using a beamforming algorithm; and
removing a clutter signal and a noise signal of the reflected wave to obtain the first millimeter wave.

* * * * *